United States Patent
Yoo

(10) Patent No.: US 9,244,835 B2
(45) Date of Patent: Jan. 26, 2016

(54) CONTROL CIRCUIT OF SEMICONDUCTOR DEVICE AND SEMICONDUCTOR MEMORY DEVICE

(71) Applicant: SK hynix Inc., Gyeonggi-do (KR)

(72) Inventor: Byoung Sung Yoo, Seoul (KR)

(73) Assignee: SK Hynix Inc., Gyeonggi-do (KR)

( * ) Notice: Subject to any disclaimer, the term of this patent is extended or adjusted under 35 U.S.C. 154(b) by 150 days.

(21) Appl. No.: 14/092,430

(22) Filed: Nov. 27, 2013

(65) Prior Publication Data

US 2015/0019791 A1 Jan. 15, 2015

(30) Foreign Application Priority Data

Jul. 15, 2013 (KR) ........................ 10-2013-0082904

(51) Int. Cl.
*G06F 12/02* (2006.01)

(52) U.S. Cl.
CPC ........ *G06F 12/0246* (2013.01); *G06F 12/0207* (2013.01); *G06F 2212/7201* (2013.01)

(58) Field of Classification Search
None
See application file for complete search history.

(56) References Cited

U.S. PATENT DOCUMENTS

| | | | |
|---|---|---|---|
| 8,850,103 B2* | 9/2014 | Bennett | 711/103 |
| 2004/0148457 A1* | 7/2004 | Hakushi et al. | 711/103 |
| 2011/0113187 A1* | 5/2011 | Kashiwagi | 711/103 |
| 2013/0198451 A1* | 8/2013 | Hyun et al. | 711/114 |

FOREIGN PATENT DOCUMENTS

| | | |
|---|---|---|
| KR | 100290474 | 6/2001 |
| KR | 1020120092561 | 8/2012 |

* cited by examiner

*Primary Examiner* — Gary Portka
(74) *Attorney, Agent, or Firm* — IP & T Group LLP

(57) ABSTRACT

A control circuit includes a ROM suitable for generating ROM data based on a ROM address corresponding to a predetermined operation, a command analyzing unit suitable for outputting the ROM address corresponding to the predetermined operation, generating an address storing signal in response to an operation suspension command for suspending the predetermined operation, and generating an address output signal in response to an operation resumption command for resuming the predetermined operation, an address storing unit suitable for storing a ROM address, which corresponds to the ROM address at a time point where the predetermined operation is suspended, in response to the address storing signal, and an address output unit suitable for outputting the ROM address corresponding to said time point in response to the address output signal, wherein the ROM generates ROM data for resuming the predetermined operation based on the ROM address corresponding to said time point.

16 Claims, 7 Drawing Sheets

_US 9,244,835 B2_

CONTROL CIRCUIT OF SEMICONDUCTOR DEVICE AND SEMICONDUCTOR MEMORY DEVICE

CROSS-REFERENCE TO RELATED APPLICATION

The present application claims priority of Korean patent application number 10-2013-0082904, filed on Jul. 15, 2013, in the Korean Intellectual Property Office, the entire disclosure of which is incorporated herein by reference in its entirety.

BACKGROUND

1. Technical Field

Various embodiments of the present invention relate to a semiconductor device.

2. Related Art

A Semiconductor memory device, among semiconductor devices, may be largely classified as either a volatile memory device or a non-volatile memory device.

The volatile memory device may perform a read/write operation at a high speed, and may lose stored data when a power supply is blocked. Meanwhile, the non-volatile memory device tends to have a lower speed than the volatile memory device in the read/write operation, and may retain the stored data even when the power supply is blocked. Accordingly, the non-volatile memory device is used to store data to be maintained regardless of the supplying of the power. There are a read-only memory (ROM), a mask ROM (MROM), a programmable ROM (PROM), an erasable programmable ROM (EPROM), an electrically erasable programmable ROM (EEPROM), a flash memory, a phase-change random access memory (PRAM) a magnetic RAM (MRAM), a resistive RAM (RRAM), a ferroelectric RAM (FRAM), and so on, in the non-volatile memory device. Flash memories may be classified with a NOR-type flash memory device and a NAND-type flash memory device.

Performance of semiconductor memory devices may be degraded due to various causes.

BRIEF SUMMARY

Various embodiments of the present invention are directed to a control circuit of a semiconductor device that may improve operational performance, and semiconductor memory device.

According to one aspect of the present invention, a control circuit of a semiconductor device may include a ROM suitable for generating ROM data based on a ROM address corresponding to a predetermined operation, command analyzing unit suitable for outputting the ROM address corresponding to the predetermined operation, for generating an address storing signal in response to an operation suspension command for suspending the predetermined operation, and for generating an address output signal in response to an operation resumption command for resuming the predetermined operation, an address storing unit suitable for storing a ROM address, which corresponds to the ROM address at a time point where the predetermined operation is suspended, in response to the address storing signal, and an address output unit suitable for outputting the ROM address corresponding to the time point response to the address output signal, wherein the ROM generates ROM data for resuming the predetermined operation based on the ROM address corresponding to the time point.

According to another aspect of the present invention, a semiconductor memory device may include a peripheral circuit suitable for performing a predetermined operation on the memory array, a control circuit suitable for controlling the peripheral circuit. The control circuit may include a ROM suitable for generating ROM data based on a ROM address corresponding to a predetermined operation, a command analyzing unit suitable for outputting the ROM address corresponding to the predetermined operation, generating an address storing signal in response to an operation suspension command for suspending the predetermined operation, and generating an address output signal in response to an operation resumption command for resuming the predetermined operation, an address storing unit suitable for storing a ROM address, which corresponds to the ROM address at a time point where the operation is suspended, in response to the address storing signal, and an address output unit suitable for outputting the ROM address corresponding to said time point in response to the address output signal, wherein the ROM generates ROM data for resuming the predetermined operation based on the ROM address corresponding to said time point.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION

Figure 1:
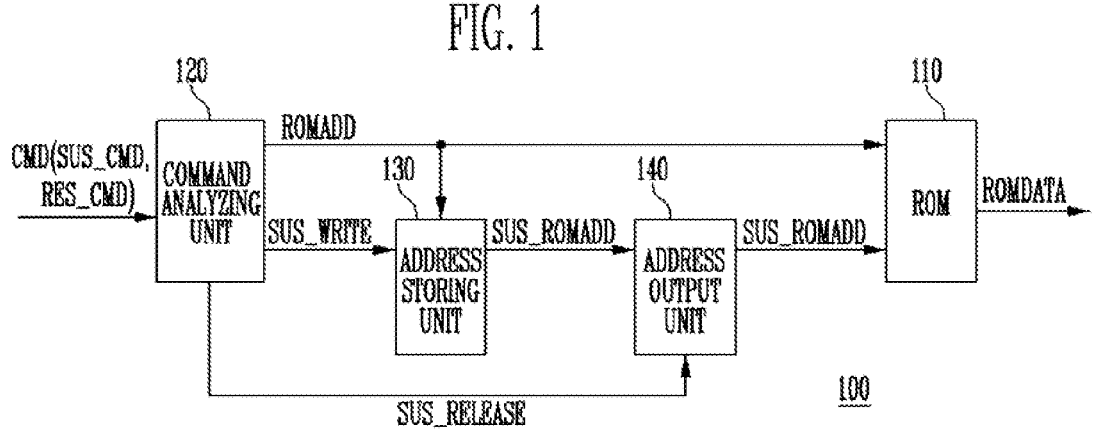
FIG. 1 is a block diagram illustrating a control circuit according to an exemplary embodiment of the present invention.

The present invention will be described more fully hereinafter with reference to the accompanying drawings, which exemplary embodiments of the invention are shown. This invention may, however, be embodied in different forms and should not be construed as limited to the embodiments set forth herein. Rather, the embodiment is provided to more sincerely and fully disclose the present invention and to completely transfer the spirit of the present invention to those skilled in the art to which the present invention pertains, and the scope of the present invention should be understood by the claims of the present invention. Throughout the disclosure, reference numerals correspond directly to the like numbered parts in the various figures and embodiments of the present invention. It is also noted that in this specification, "connected/coupled" refers to one component not only directly coupling another component but also indirectly coupling another component through an intermediate component. In addition, a singular form may include a plural form as long as it is not specifically mentioned in a sentence.

FIG. 1 is a block diagram illustrating a control circuit according to an exemplary embodiment of the present invention.

Referring to FIG. 1, the control circuit 100 may include a ROM 110, a command analyzing unit 120, an address storing unit 130, and an address output unit 140.

The ROM 110 may generate ROM data ROMDATA based on a ROM address ROMADD corresponding to an operation that a peripheral circuit controlled by the control circuit 100 performs.

The command analyzing unit 120 may output the ROM address ROMADD, which corresponds to the operation to the ROM 110, in response to a command CMD. The command analyzing unit 120 may generate an address storing signal SUS_WRITE in response to an operation suspension command SUS_CMD. The command analyzing unit 120 may generate an address output signal SUS_RELEASE in response to an operation resumption command RES_CMD.

The address storing unit 130 may store a ROM address SUS_ROMADD, which corresponds to the ROM address at a time point where an operation is suspended, in response to the address storing signal SUS_WRITE. The address storing unit 130 may be implemented by a flip-flop.

The address output unit 140 may output the ROM address SUS_ROMADD input from the address staring unit 130 to the ROM 110 in response to the address output signal SUS_RELEASE.

The ROM 110 may generate the ROM data ROMDATA for resuming an operation based on the ROM address SUS_ROMADD.

As an embodiment, an operation that the peripheral circuit performs and the controller controls may be an erase operation on a memory block. After performing the erase operation on the memory block, an erase verifying operation may be performed. If the erase verifying operation is not passed, that is, if there is a memory cell that a threshold voltage is higher than an erase verifying voltage among memory cells included in the memory block, a next erase operation may be performed by increasing the erase voltage. During the erase operation that utilizes increasing of the erase voltage, it may be necessary to read data stored in memory cells of another memory block according to a request of a host. In this case, as described above, the command analyzing unit 120 may suspend the erase operation in response to the operation suspension command SUS_CMD output from the host, and output the ROM address ROMADD to the ROM 110 to allow the memory cells of the other memory block to perform a read operation.

If the read operation is completed, the command analyzing unit 120 may perform the suspended erase operation again in response to the operation resumption command RES_CMD. In an embodiment of the present invention, a ROM address SUS_ROMADD which corresponds to the ROM address at a time point where the erase operation is suspended, may be stored in the address storing unit 130 and output to perform the erase operation again. Accordingly, since part of the erase operation does not need to be performed again based on an erase voltage of the time point where the operation is suspended, the time used to perform the erase operation after suspended may be shortened, and overerase phenomena and performance degradation of the memory cells may be prevented.

Figure 2:
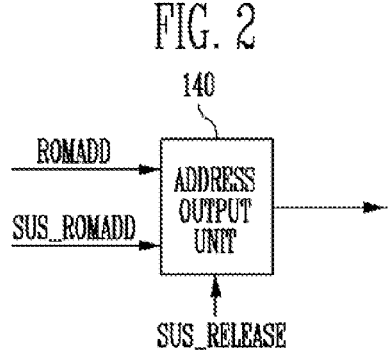
FIG. 2 is a block diagram for explaining an address output unit shown in FIG. 1.

FIG. 2 is a block diagram for explaining the address output unit 140 shown in FIG. 1.

Referring to FIG. 2, the address output unit 140 may selectively output the ROM address ROMADD of a normal operation output from the command analyzing unit 120 or a ROM address SUS_ROMADD which corresponds to the ROM address at the time point where an operation is suspended, output from the address storing unit 130, in response to the address output signal SUS_RELEASE.

As an embodiment, the address output unit 140 may be implemented by a multiplexer. The address output unit 140 may output the ROM address ROMADD of the normal operation in response to the address output signal SUS_RELEASE of a first level (a logic "low") and the ROM address SUS_ROMADD, which corresponds to the ROM address at the time point where an operation is suspended, in response to the address output signal SUS_RELEASE of a second level (a logic "high").

Figure 3:
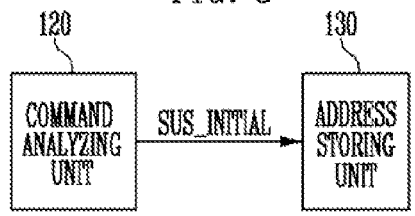
FIG. 3 is a block diagram for explaining a command analyzing unit and an address storing unit shown in FIG. 1.

FIG. 3 is a block diagram for explaining the command analyzing unit 120 and the address storing nit 130 shown in FIG. 1.

Referring to FIG. 3, the command analyzing unit 120, if an operation is completed after resuming the operation, may generate an initialization signal SUS_INITIAL for initializing the address storing unit 130, and output the initialization signal SUS_INITIAL to the address storing unit 130.

The address storing unit 130 may initialize a stored address in response to the initialization signal SUS_INITIAL.

Accordingly, if the operation is suspended while performing a new operation, the ROM address SUS_ROMADD, which corresponds to the ROM address at the time point where the operation is suspended, may be stored.

The command analyzing unit 120 may activate the initialization signal SUS_INITIAL for initializing the address storing unit 130 during power-up, and output the initialization signal SUS_INITIAL to the address storing unit 130.

Figure 4:
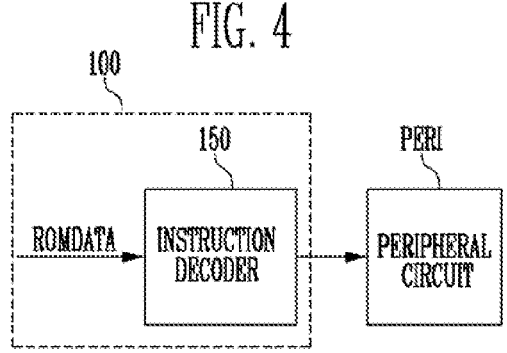
FIG. 4 is a block diagram for explaining the control circuit of FIG. 1.

FIG. 4 is a block diagram for explaining the control circuit 100 shown in FIG. 1.

Referring to FIG. 4, the control circuit 100 may further include an instruction decoder 150 configured to control a peripheral circuit PERI to perform an operation, based on the ROM data ROMDATA.

The instruction decoder 150 may decode the ROM data ROMDATA output from the ROM 110 to control the peripheral circuit PERI.

Figure 5:
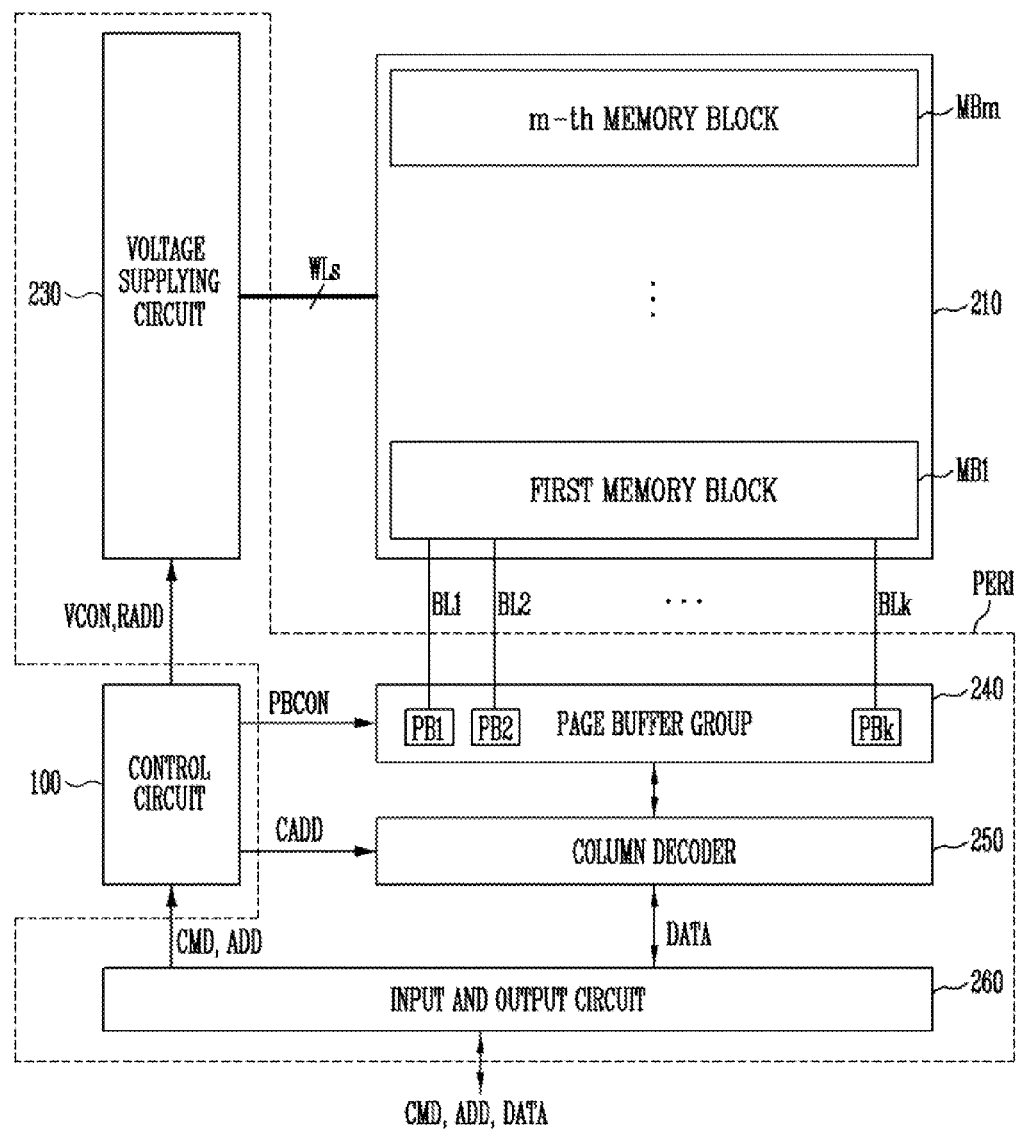
FIG. 5 is a block diagram illustrating a semiconductor memory device according to an exemplary embodiment of the present invention.

FIG. 5 is a block diagram illustrating a semiconductor memory device according to an exemplary embodiment of the present invention.

Figure 6:
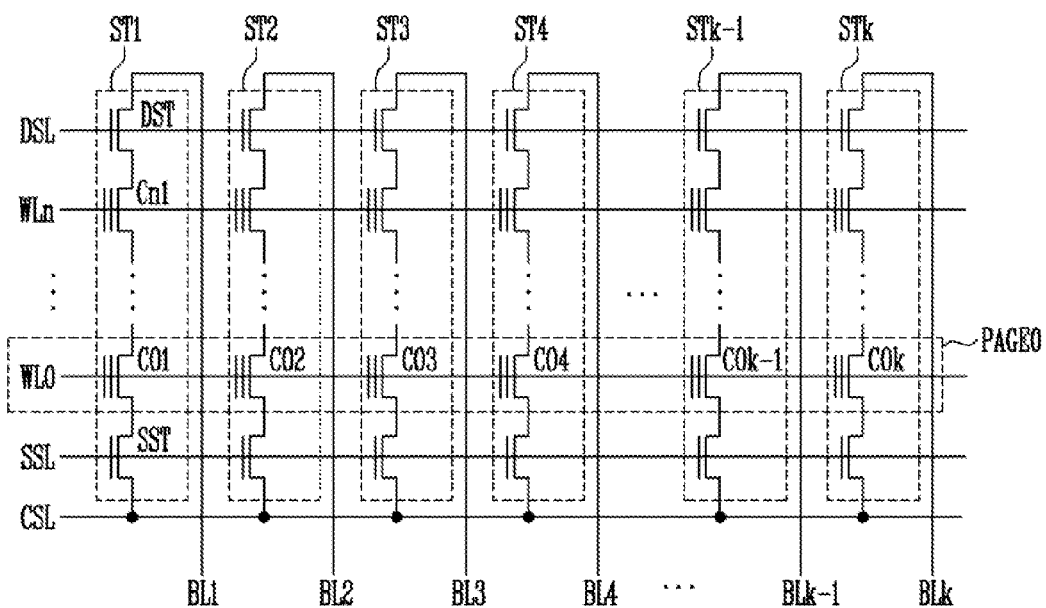
FIG. 6 is a detailed diagram illustrating a memory block shown in FIG. 5.

FIG. 6 is a detailed diagram of a memory block shown in FIG. 5.

Referring to FIG. 5, the semiconductor memory device may include a memory array 210 including first to m-th memory blocks MB1 to MBm, a peripheral circuit PERI configured to perform a read operation and an erase operation on memory cells included in a selected page of the memory blocks MB1 to MBm, and a control circuit 100 for controlling the peripheral circuit PERI. The peripheral circuit PERI may include a voltage supplying circuit 230, a page buffer group 240, a column decoder 250, and an input and output circuit 260.

Referring to FIG. 6, each memory block may include a plurality of strings ST1 to STk connected between bit lines BL1 to BLk and a common source line CSL. That is, the strings ST1 to STk may be connected to corresponding bit lines BL1 to BLk, respectively, and commonly connected to the common source line CSL. Each string ST1 may include a source select transistor SST having a source connected to the common source line CSL, a plurality of memory cells C01 to Cn1, and a drain select transistor DST having a drain connected to a bit line BL1. The memory cells C01 to Cn1 may be serially connected between the select transistors SST and DST. A gate of the source select transistor may be connected to a source select line SSL, gates of the memory cells C01 to Cn1 may be connected to word lines WL0 to WLn, respectively. A gate of the drain transistor DST may be connected to a drain select line DSL.

The memory cells included in the memory block may be divided in unit of page. For example, the memory cells C01 to C0k connected in one word line (e.g., WL0) may construct one page PAGE0. The page may be a basic unit for a program operation or a read operation.

The control circuit 100 may output a voltage control signal VCON for generating a voltage required for performing a verifying operation, a read operation, or an erase operation, in response to a command signal CMD input through the input and output circuit 260 from the outside, and output a PB control signal PBCON for controlling the page buffers PB1 to PBk included in the page buffer group 240 according to a kind of operation. Further, the control circuit 100 may output a row address signal RADD and a column address signal CADD based on an address signal ADD input through the input and output circuit 260 from the outside.

The voltage supplying circuit 230 may provide operation voltages required for the read operation or the erase operation on memory cells with local lines including the drain select line DSL, the word lines WL0 to WLn, and the source select line SSL of a selected memory block, in response to the voltage control signal VCON. The voltage supplying circuit 230 may include a voltage generating circuit and a row decoder.

The voltage generating circuit may provide the operation voltages required for the read operation or the erase operation on the memory cells with global lines, in response to the voltage control signal VCON of the control circuit 100. For example, for the read operation, the voltage generating circuit may output a read voltage for applying to memory cells of a selected page and a pass voltage for applying to non-selected memory cells to the global lines. For the erase operation, the voltage generating circuit may output an erase voltage for applying to memory cells of a selected memory block to the global lines.

The row decoder may connect the global lines and the local lines DSL, WL0 to WLn and SSL based on the row address signal RADD of the control circuit 100 so that the operation voltages output from the voltage generating circuit to the global lines transfer to the local lines DSL, WL0 to WLn and SSL of a memory block selected in the memory array 210. Accordingly, the read voltage may be applied to a local word line (e.g., WL0) connected to a selected cell (e.g., C01) through the global word line from the voltage generating circuit. The pass voltage may be applied to local word lines (e.g. WL1 to WLn) connected to non-selected cells C11 to Cn1 through the global word lines from the voltage generating circuit. In the erase operation, the erase voltage may be applied to all of the memory cells in a memory block. Accordingly, data stored in the selected cell C01 may be read out by the read voltage Vread.

The page buffer group 240 may include a plurality of page buffers PB1 to PBk connected to the memory array 210 through the bit lines BL1 to BLk, respectively. The page buffers PB1 to PBk of the page buffer group 240 may selectively precharge the bit lines BL1 to BLk according to input data for storing data in the memory cells C01 to C0k or sense voltages of the bit lines BL1 to BLk for reading out data from the memory cells C01 to C0k, in response to the PB control signal PBCON of the control circuit 100.

For example, in the read operation, the page buffer group 240 may precharge selected bit lines. If the read voltage is applied from the voltage supplying circuit 230 to a selected word line WL0, bit lines of memory cells in which program data are stored may be maintained in a precharge state, and bit lines of memory cells in which erase data are stored may be discharged. The page buffer group 240 may sense voltage changes of the bit lines BL1 to BLk and may latch data of the memory cells corresponding to the sensing result.

The column decoder 250 may select the page buffers PB1 to PBk included in the page buffer group 240, based on the column address signal CADD output from the control circuit 100. That is, the column decoder 250 may sequentially transfer data to be stored in the memory cells to the page buffers PB1 to PBk based on the column address signal CADD. Further, the column decoder 250 may sequentially select the page buffers PB1 to PBk based on the column address signal CADD so that data of the memory cells latched in the page buffers PB1 to PBk by the read operation is output to the outside.

The input and output circuit 260, in order to store data in the memory cells in a program operation, may input data input from the outside to the page buffer group 240 and transfer the data to the column decoder 250 under control of the control circuit 100. If the column decoder 250 transfers the data input from the input and output circuit 260 to the page buffers PB1 to PBk of the page buffer group 240 as described above, the page buffers PB1 to PBk may store the input data in an internal latch circuit. Further, in the read operation, the input and output circuit 260 may output the data transferred through the column decoder 250 from the page buffers PB1 to PBk of the page buffer group 240 to the outside.

An operation method of the semiconductor memory device having the above construction will be explained below.

Figure 7:
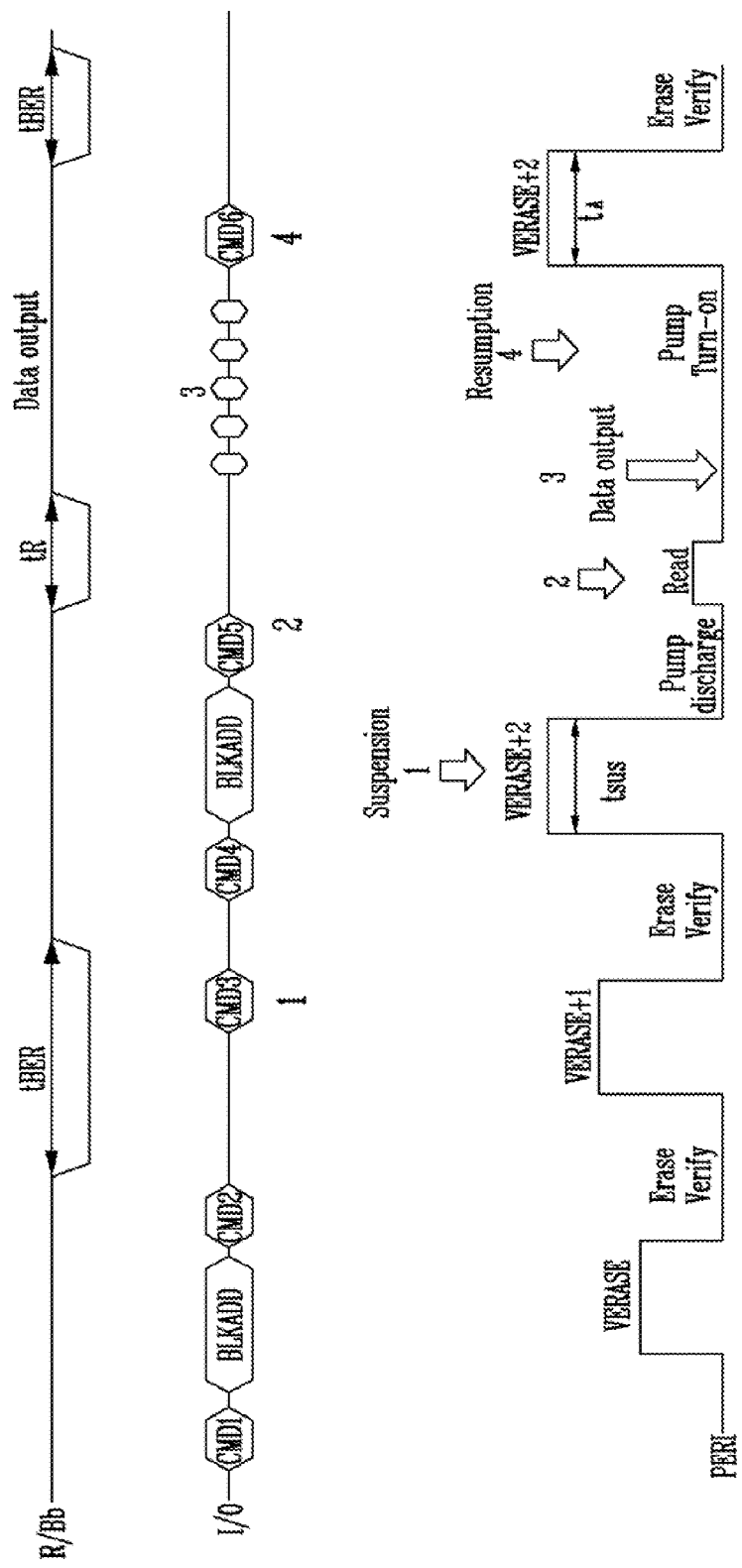
FIG. 7 is a waveform diagram for explaining an operation method of a semiconductor memory device.

FIG. 7 is a waveform diagram for explaining an operation method of a semiconductor memory device.

Referring to FIG. 7, in the operation method of the semiconductor memory device, an erase command CMD1, a memory block address BLKADD for performing an erase operation, and an erase confirm command CMD2 may be input to the input/output circuit I/O.

If a ready/busy signal R/Bb falls to a low level, the peripheral circuit PERI may perform the erase operation. The peripheral circuit PERI may perform an erase verifying operation after performing the erase operation. If there is a memory cell in which a threshold voltage is lower than the erase verifying voltage after performing the erase verifying operation, the erase verifying operation may be processed as not passing, and the erase operation may be performed by increasing the erase voltage to a second erase voltage VERASE+1

If an operation suspension command CMD is input to the input and output circuit I/O (1), the ready/busy signal R/Bb may become a high level and the peripheral circuit PERI may suspend the erase operation. Accordingly, the erase operation performed by a third erase voltage VERASE+2 may be suspended.

Next, a read command CMD4, a memory block address BLKADD for performing a read operation, and a read confirm command CMD5 may be input (2).

If the ready/busy signal R/Bb falls to a low level, a pump generating the erase voltage may be discharged and the read operation may be performed on memory cells (Read). If the ready/busy signal R/Bb becomes a high level, data may be output to the input and output circuit I/O (Data output, 3).

If an operation resumption command CMD 6 is input to the input and output circuit I/O (4), the ready/busy signal R/Bb may fall to a low level, and the suspended erase operation may be performed again. The pump for generating the erase voltage may be turned on again, and the erase operation may be performed again by the third erase voltage VERASE+2.

In the operation method of the semiconductor memory device, if the erase operation is suspended, a number of applications of the erase voltage may be stored, and if the erase operation is resumed, the erase operation may be resumed based on the stored number of applications of the erase voltage. Accordingly, a time used in the erase operation may increase. Here, '$t_A$' denotes a time occupied in increasing an erase pulse to a target level and performing an erase operation, and 'tsus' denotes a time occupied in suspending the erase operation after inputting the suspended command. Accordingly, '$t_A$-tsus' corresponds to a time used until the erase operation is suspended. After this, if the erase operation is resumed, since the time '$t_A$' is taken again, a time taken until the erase operation is resumed after suspending the erase operation may be '$2t_A$-tsus'.

Figure 8:
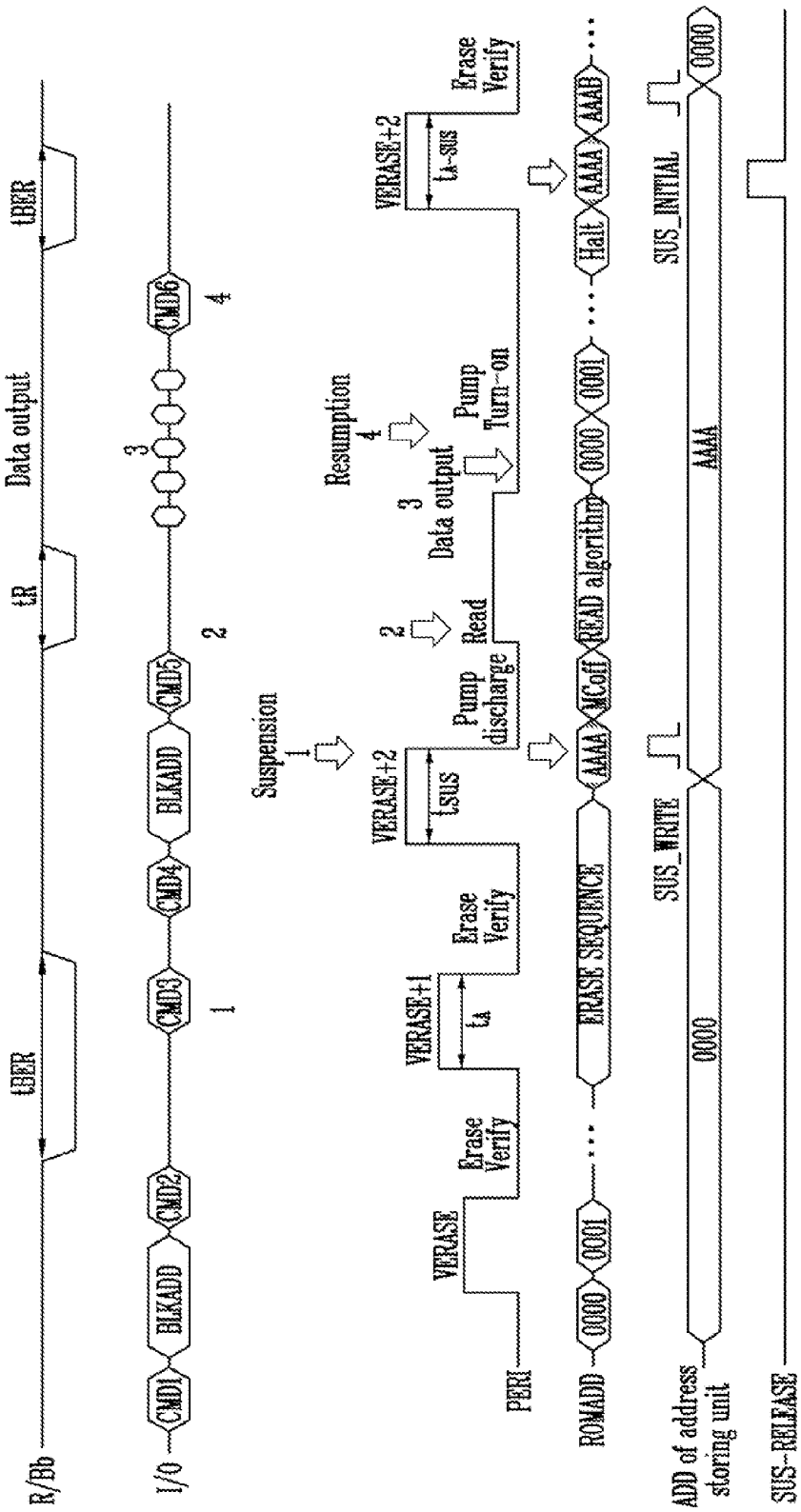
FIG. 8 is a waveform diagram for explaining an operation method of a semiconductor memory device according to an exemplary embodiment of the present invention.

FIG. 8 is a waveform diagram for explaining an operation method of a semiconductor memory device according to an exemplary embodiment of the present invention.

Referring to FIG. 8, in the operation method of the semiconductor memory device according to an exemplary embodiment of the present invention, an erase command CMD1, a memory block address BLKADD for performing an erase operation and an erase confirm command CMD2 may be input to the input/output circuit I/O.

If a ready/busy signal R/Bb falls to a low level, the peripheral circuit PERI may perform the erase operation based on ROM data output based on a ROM address. The peripheral circuit PERI may perform an erase verifying operation (Erase Verify) after performing the erase operation by a first erase voltage (VERASE). If there is a memory cell in which a threshold voltage is lower than the erase verifying voltage after performing the erase verifying operation, the erase verifying operation may be processed as not passing and the erase operation may be performed by increasing the erase voltage to a second erase voltage VERASE+1.

If an operation suspension command CMD3 is input to the input and output circuit I/O (1), the ready/busy signal R/Bb may become a high level and the peripheral circuit PERI may suspend the erase operation under the control of the control circuit. Accordingly, after completing the erase operation performed by a third erase voltage VERASE+2, a next operation may be suspended. At this time, a ROM address AAAA, which corresponds to the ROM address at the time point where the erase operation is suspended, may be stored in the address storing unit in response to an address storing signal SUS_WRITE.

Next, a read command CMD4, a memory block address BLKADD for performing a read operation, and a read confirm command CMD5 may be input (2).

If the ready/busy signal R/Bb falls to a low level, a pump generating the erase voltage may be discharged and a read operation may be performed on memory cells based on ROM data output according to a ROM address ROMADD (Read).

If the ready/busy signal R/Bb becomes a high level, data may be output (Data output) to the input and output circuit I/O (3).

If an operation resumption command CMD 6 is input to the input and output circuit I/O (4) the ready/busy signal R/Bb falls to a low level and the suspended erase operation may be performed again. If the pump for generating the erase voltage is turned on again and the ROM address AAAA, which corresponds to the ROM address at the time point where the erase operation is suspended, that is stored in the address storing unit is input to the ROM in response to an address output signal SUS_RELEASE, the erase operation may be performed again based on ROM data according to the ROM address AAAA, which corresponds to the ROM address at the time point where the erase operation is suspended.

After this, the address storing unit may be initialized (0000) in response to an initialization signal SUS_INITIAL.

The operation method of the semiconductor memory device may include storing a ROM address SUS_ROMADD, which corresponds to the ROM address at the time point where the erase operation is suspended, in the address storing unit, outputting the ROM address SUS_ROMADD, which corresponds to the ROM address at the time point where the erase operation is suspended, to the ROM, and performing the erase operation again. Accordingly, since the erase operation does not need to be performed again based on the erase voltage of the time point where the erase operation is suspended, a time used in the erase operation while the erase operation is suspended may be shortened, and overerase phenomena and performance degradation of memory cells may be prevented. Here, '$t_A$' denotes a time occupied in increasing an erase pulse to a target level and performing an erase operation, and 'tsus' denotes a time occupied in suspending the erase operation after inputting the suspended commands. Accordingly, '$t_A$-tsus' corresponds to a time used until the erase operation is suspended. After this, if the erase operation is resumed, since the time 'tsus' is taken, a time taken until the erase operation is resumed after suspending the erase operation may be '$t_A$'.

Figure 9:
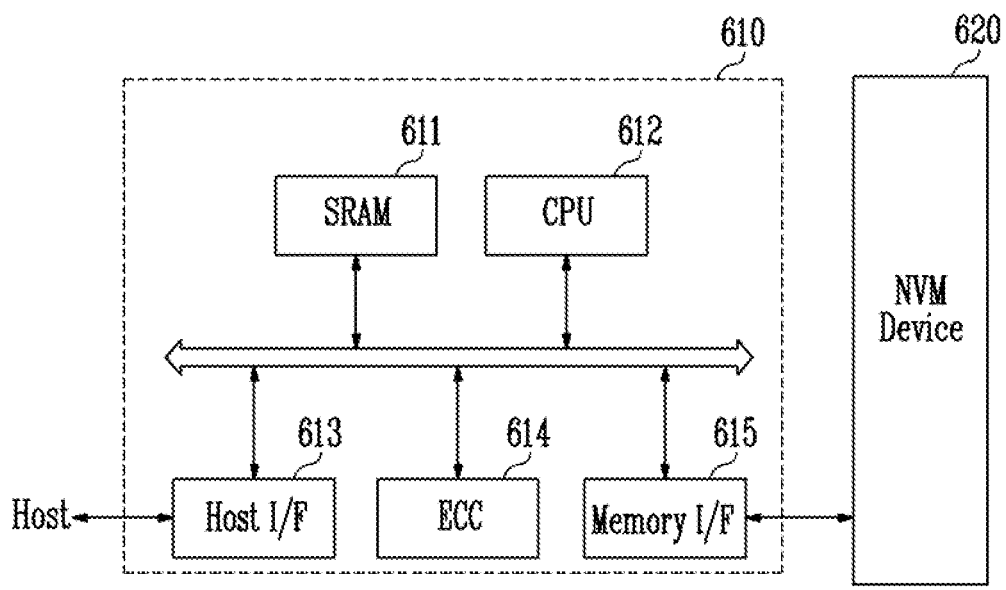
FIG. 9 is a block diagram illustrating a memory system according to an exemplary embodiment of the present invention.

FIG. 9 is a block diagram illustrating a memory system 600 according to an embodiment of the present invention.

Referring to FIG. 9, the memory system 600 may include a non-volatile memory (NVM) device 620, and a memory controller 610.

The non-volatile memory device 620 may include the aforementioned semiconductor memory device for compatibility with the memory controller 610, and may be operated by the aforementioned method. The memory controller 610 may control the non-volatile memory device 620. The memory system 600 may be provided as a memory card or a solid-state disk (SSD) by combining the non-volatile memory device 620 and the memory controller 610. A static random access memory (SRAM) 611 may be used as an operational memory of a central processing unit (CPU) 612. A host interface (I/F) 613 may include a data exchange protocol of a host connected to the memory system 600. An error correction circuit (ECC) 614 may detect and correct an error included in data read out from the non-volatile memory device 620. A memory interface 614 may interface with the non-volatile memory device 620 of the embodiment of the present invention. The CPU 612 may perform various control operations for data exchange of the memory controller 610.

Even though not shown in FIG. 9, it may be obvious for a person of ordinary skill in the art that the memory system 600 further includes a ROM or the like (not shown) storing code data for interfacing with the host. The non-volatile memory device 620 may be a multi-chip package configured as a plurality of flash memory chips. The memory system 600 of the embodiment of the present invention may lower an error generation probability and may be provided as a storage medium with high reliability. Especially, the flash memory device of the embodiment of the present invention may be included in a memory system such as an SSD. Here, the memory controller 610 may communicate with the outside, for example, a host, through one of various interface protocols, such as a universal serial bus (USB), a multi-media card (MMC), a peripheral component interconnect-express (PCI-E), a serial advance technology attachment (SATA), a parallel advance technology attachment (PATA), a Small computer system interface (SCSI), an enhanced small device interface (ESDI), and an integrated drive electronics (IDE).

Figure 10:
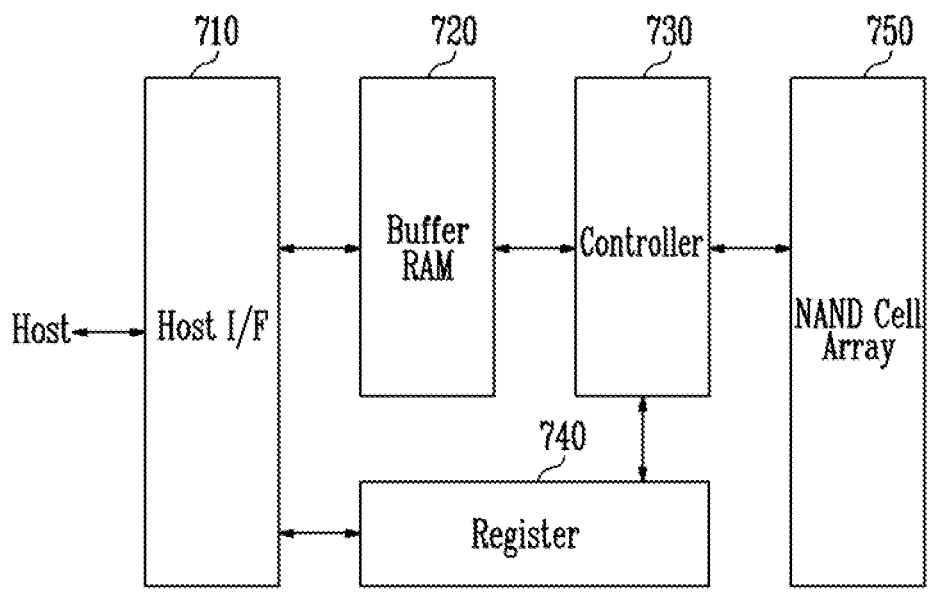
FIG. 10 is a block diagram illustrating a fusion memory device or a fusion memory system performing a program operation according to the embodiments of the present invention.

FIG. 10 is a block diagram illustrating a fusion memory device or a fusion memory system performing an operation according to aforementioned various embodiments. For example, technical characteristics of the present invention may be applied to a OneNAND flash memory device 700 as the fusion memory device.

The OneNAND flash memory device 700 may include a host interface 710 for exchanging various information with an apparatus using a different protocol, a buffer RAM 720 for embedding codes to drive a memory device and temporarily storing data, a controller 730 for controlling a read operation, a program operation and every operation in response to a control signal and a command which are input from the outside, a register 740 for storing data such as a command, an address, a configuration for defining system operational environments of the inside of the memory device, and a NAND flash cell array 750 configured by an operational circuit including a non-volatile memory cell and a page buffer. The OneNAND flash memory device may be programmed as described above in response to a write request from the host.

Figure 11:
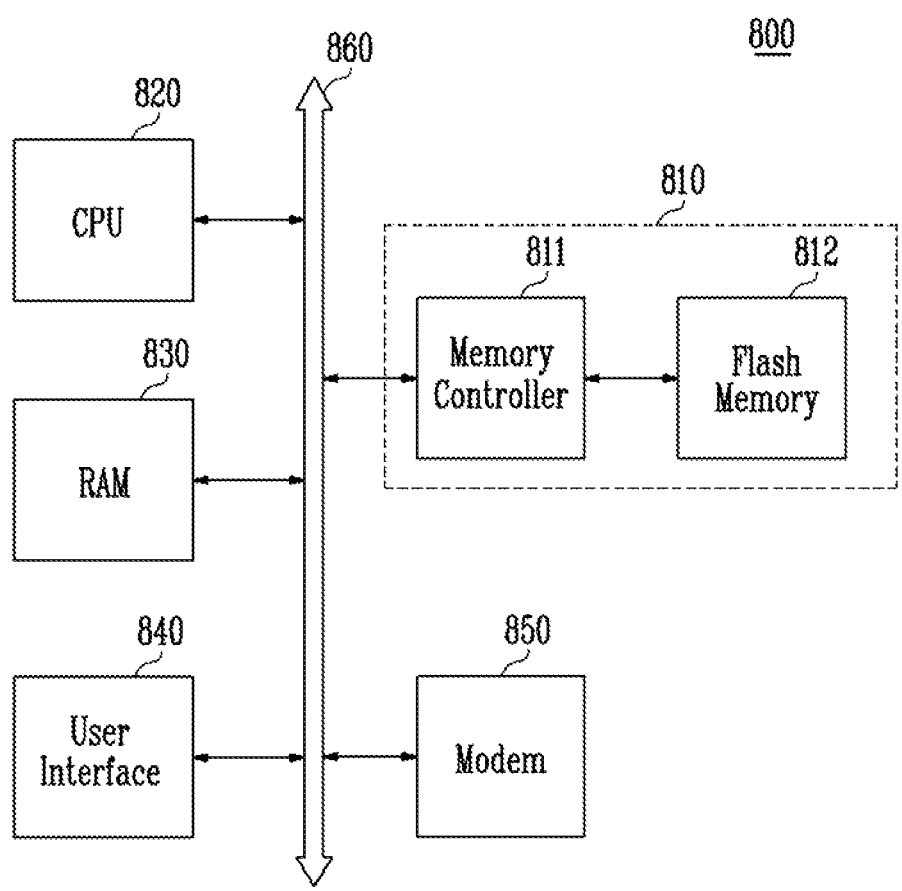
FIG. 11 is a block diagram illustrating a computing system including a flash memory device according to an exemplary embodiment of the present invention.

FIG. 11 is a block diagram illustrating a computing system 800 including a flash memory 812 according to an embodiment of the present invention.

The computing system 800 according to the present invention may include a central processing unit (CPU) 820, a RAM 830, a user interface 840, a modem 850 such as a baseband chipset, and a memory system 810 including a memory controller 811 and a flash memory 812, which are connected to a system bus 860. If the computing system 800 of the embodiment of the present invention is a mobile apparatus, the computing system 800 may further include a battery (not shown) for providing an operational voltage of the computing system 800. Even through not shown in FIG. 11, it may be obvious to a person of ordinary skill in the art that the computing system 800 may further include an application chipset, a camera image processor CIP, a mobile DRAM, or the like. For example, the memory system 810 may be configured by an SSD using a non-volatile memory for storing data. The memory system 810 may be provided as a fusion flash memory, for example, a OneNAND flash memory.

According to the semiconductor memory device of the embodiments of the present invention, the semiconductor memory device may store a ROM address, which corresponds to the ROM address at a time point where an operation is suspended, may output the ROM address, and may resume the suspended operation. Accordingly, since a part of the operation performed up until the operation is suspended does not need to be performed again, a time used in the operation may be shortened and performance degradation may be prevented.

While typical example embodiments of the invention have been described herein using specific terms and with reference to the appended drawings, this disclosure is not intended to limit the scope of the invention. It will be understood by those of ordinary skill in the art that various changes in form and details may be made to the disclosed embodiments without departing from the spirit and scope of the present invention as defined by the following claims.

What is claimed is:

1. A control circuit of a semiconductor device, comprising:
   a ROM suitable for generating ROM data based on a ROM address corresponding to a predetermined operation;
   a command analyzing unit suitable for outputting the ROM address corresponding to the predetermined operation, for generating an address storing signal in response to an operation suspension command for suspending the predetermined operation, and for generating an address output signal in response to an operation resumption command for resuming the predetermined operation;
   an address storing unit suitable for storing a ROM address, which corresponds to the ROM address at a time point where the predetermined operation is suspended, in response to the address storing signal;
   an address output unit suitable for outputting the ROM address corresponding to the time point in response to the address output signal; and
   an instruction decoder suitable for decoding the ROM data output from the ROM to control an internal circuit performing the predetermined operation,
   wherein the ROM generates the ROM data based on the ROM address output from the address output unit when the predetermined operation is resumed.

2. The control circuit of claim 1, wherein the address storing unit is initialized in response to an initialization signal, which is activated by the command analyzing unit when the predetermined operation is completed after resuming the operation.

3. The control circuit of claim 2, wherein the command analyzing unit activates the initialization signal for initializing the address storing during power-up.

4. The control circuit of claim 1, wherein the predetermined operation is an erase operation on a memory block included in the semiconductor device.

5. The control circuit of claim 4, wherein the command analyzing unit outputs a ROM address corresponding to a read operation on memory cells of another memory block after the erase operation is suspended.

6. The control circuit of claim 1, wherein the address storing unit includes a flip-flop.

7. The control circuit of claim 1, wherein the address output unit selectively outputs a ROM address corresponding to the predetermined operation or a ROM address, which corresponds to the ROM address at a time point where the predetermined operation is suspended, in response to the address output signal.

8. The control circuit of claim 7, wherein the address output unit includes a multiplexer.

9. A semiconductor memory device, comprising:
   a memory array having a plurality of memory blocks;
   a peripheral circuit suitable for performing a predetermined operation on the memory array;
   a control circuit suitable for controlling the peripheral circuit,
   wherein the control circuit comprises:
   a ROM suitable for generating ROM data based on a ROM address corresponding to a predetermined operation;

a command analyzing unit suitable for outputting the ROM address corresponding to the predetermined operation, generating an address storing signal in response to an operation suspension command for suspending the predetermined operation, and generating an address output signal in response to an operation resumption command for resuming the predetermined operation;

an address storing unit suitable for storing a ROM address, which corresponds to the ROM address at a time point where the predetermined operation is suspended, in response to the address storing signal;

an address output unit suitable for outputting the ROM address corresponding to the time point in response to the address output signal; and an instruction decoder suitable for decoding the ROM data output from the ROM to control an internal circuit performing the predetermined operation, wherein the ROM generates the ROM data based on the ROM address output from the address output unit when the predetermined operation is resumed.

10. The semiconductor memory device of claim 9, wherein the address storing unit is initialized in response to an initialization signal, which is activated by the command analyzing unit when the predetermined operation is completed after resuming the operation.

11. The semiconductor memory device of claim 10, wherein the command analyzing unit activates the initialization signal for initializing the address storing during power-up.

12. The semiconductor memory device of claim 9, wherein the predetermined operation is an erase operation on a memory block.

13. The semiconductor memory device of claim 12, wherein the command analyzing unit outputs a ROM address corresponding to a read operation on memory cells of another memory block after the erase operation is suspended.

14. The semiconductor memory device of claim 9, wherein the address storing unit includes a flip-flop.

15. The semiconductor memory device of claim 9, wherein the address output unit selectively outputs a ROM address corresponding to the predetermined operation or a ROM address, which corresponds to the ROM address at a time point where the predetermined operation is suspended, in response to the address output signal.

16. The semiconductor memory device of claim 15, wherein the address output unit includes a multiplexer.

* * * * *